(12) United States Patent
Heckler

(10) Patent No.: US 9,360,892 B2
(45) Date of Patent: Jun. 7, 2016

(54) TABLET COMPUTER STAND

(71) Applicant: Hecktech, Inc., Phoenix, AZ (US)

(72) Inventor: Dean Heckler, Phoenix, AZ (US)

(73) Assignee: HECKTECH, INC., Phoenix, AZ (US)

( * ) Notice: Subject to any disclaimer, the term of this patent is extended or adjusted under 35 U.S.C. 154(b) by 0 days.

(21) Appl. No.: 14/813,623

(22) Filed: Jul. 30, 2015

(65) Prior Publication Data

US 2016/0033997 A1    Feb. 4, 2016

Related U.S. Application Data

(60) Provisional application No. 62/031,707, filed on Jul. 31, 2014.

(51) Int. Cl.
  *F16L 3/00*   (2006.01)
  *G06F 1/16*   (2006.01)
  *F16M 11/04*  (2006.01)

(52) U.S. Cl.
  CPC .............. *G06F 1/1633* (2013.01); *F16M 11/04* (2013.01); *G06F 1/1628* (2013.01)

(58) Field of Classification Search
  CPC ....... F16M 11/06; F16M 11/08; F16M 11/10; F16M 11/04; H04M 1/04; G06F 1/1628; G06F 1/1633; Y10S 248/917
  USPC ................ 248/121, 127, 122.1, 176.1, 188.1, 248/188.8, 220.21, 220.22, 309.1, 917, 248/222.51; 455/575.1; 379/454, 455; 361/679.56
  See application file for complete search history.

(56) References Cited

U.S. PATENT DOCUMENTS

| | | | | |
|---|---|---|---|---|
| D746,292 S | * | 12/2015 | Heckler | D14/447 |
| D746,824 S | * | 1/2016 | Heckler | D14/447 |
| 2012/0061542 A1 | * | 3/2012 | Bostater | G06F 1/1628 248/278.1 |
| 2013/0048802 A1 | * | 2/2013 | Guran | F16M 11/041 248/122.1 |
| 2015/0181008 A1 | * | 6/2015 | Baschnagel | H04M 1/04 455/575.1 |
| 2015/0293344 A1 | * | 10/2015 | Schainholz | G06F 1/1628 359/822 |

\* cited by examiner

*Primary Examiner* — Todd M Epps
(74) *Attorney, Agent, or Firm* — Hartman Titus PLC; John D. Titus

(57) ABSTRACT

A computer stand for use with a tablet computer comprises a frame with a viewing aperture. The tablet computer is secured to the back of the frame with a pair of brackets, each of which consists of a structural angle having a cutout in one flange that is equal in depth to the thickness of the tablet computer. The other flange of the structural angle has a cutout that is bounded by a pair of horns that engage the rounded corners of the tablet computer. The first cutout traps the tablet computer against the back of the frame while the second cutout prevents the tablet computer from moving sideways. Because the brackets are structural channel members, the brackets add rigidity to the frame, which otherwise would be unacceptably flexible or would require additional structural reinforcement.

7 Claims, 7 Drawing Sheets

TABLET COMPUTER STAND

BACKGROUND OF THE INVENTION

This invention relates generally to point-of-sale (POS) equipment and, in particular to an apparatus for securely mounting a tablet computer for use as a retail sales terminal, informational kiosk or other application where tablet computer security is desirable.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
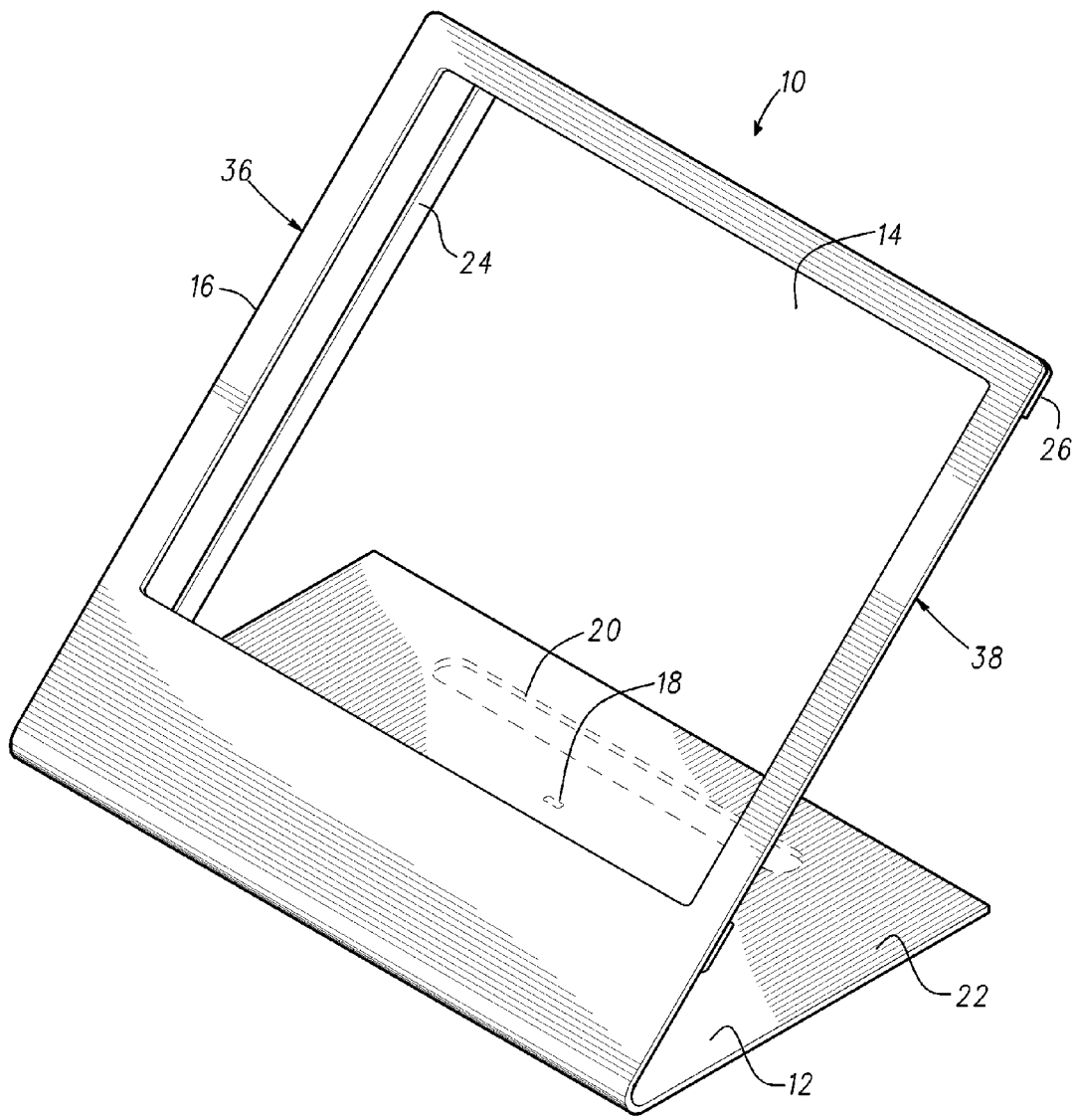
FIG. 1 is a front perspective view of a tablet stand incorporating features of the present invention.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

Figure 2:
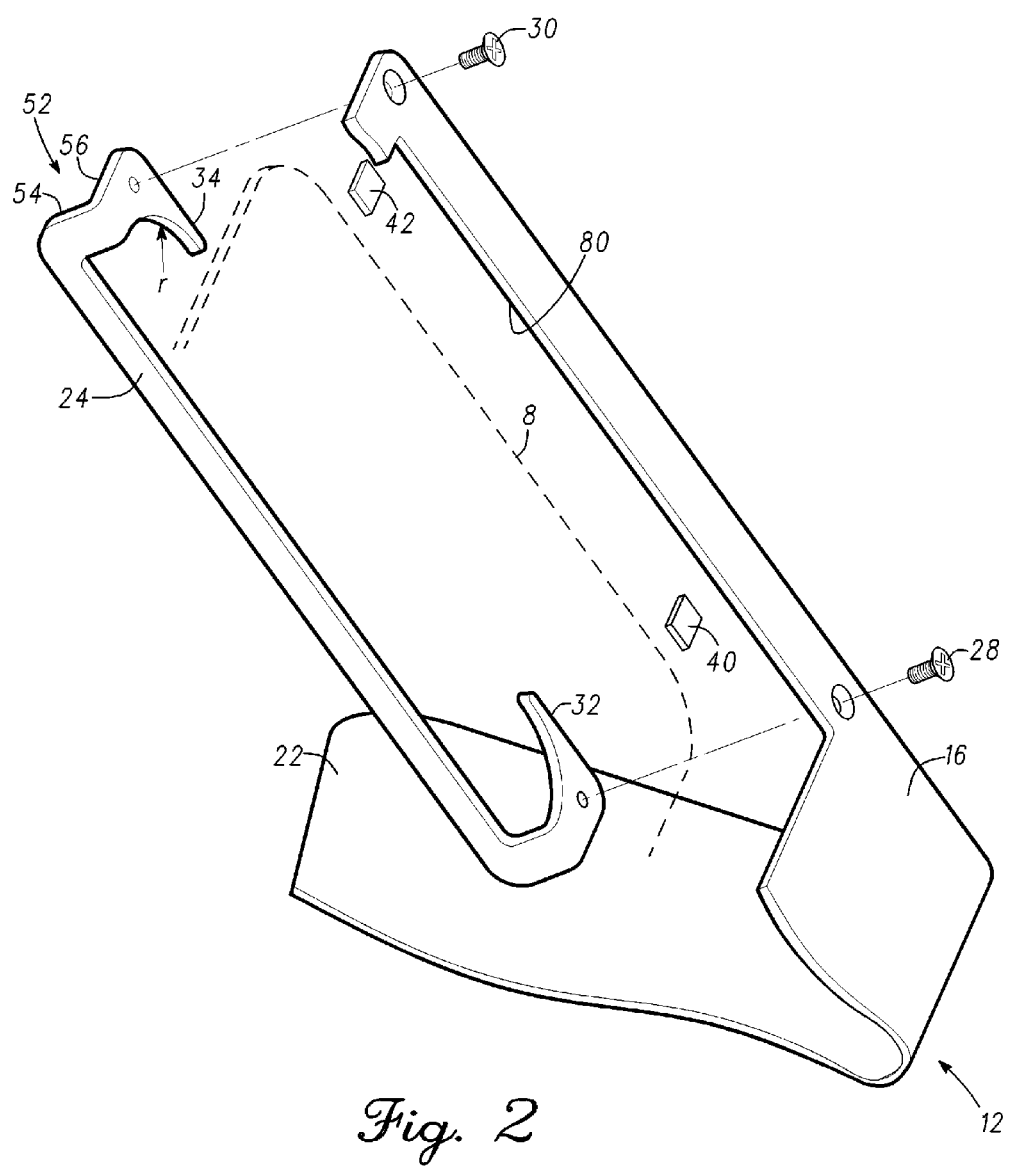
FIG. 2 is a partial front perspective view of the tablet stand of FIG. 1.

With reference to the figures and in particular FIGS. 1 and 2, a tablet stand 10 incorporating features of the present invention comprises a unitary frame 12. Frame 12 may be formed of any suitable material, but in the illustrative embodiment frame 12 is formed from a sheet of steel, which is laser-cut to include a viewing aperture 14 formed in upper portion 16 as well as apertures 18, 20, for mounting and cable feed-through in the base portion 22. Tablet stand 10 further includes retaining brackets 24, 26 which will be discussed in further detail hereinafter Retaining bracket 24 is shown in detail in FIGS. 2-5. Although retaining bracket 24 may be formed in any conventional manner, including by extrusion or molding, in the illustrative embodiment, retaining bracket 24 is formed from a generally rectangular plate 48 that is bent along a bending axis 50 approximately 90° to form a length of structural angle 52 having flanges 54, 56. In the illustrative embodiment, prior to the bending operation, an elongated C-shaped cutout 58 is formed in plate 48, preferably by laser cutting. The C-shaped cutout 58 has generally rectangular sides 60, 62, 64 and an opening 66. At each end of opening 66, C-shaped cutout 58 is formed into horns 32, 34 which are spaced apart and have inner surfaces 68, 70 each of which has an interior radius "r" that is substantially equal to a radius of a radiused corner 72 of the tablet computer 8 that is to be mounted to tablet stand 10. For reasons that will be explained more fully hereinafter, the center of curvature of the inner surfaces 68, 70 are positioned so that a circle tangent to the inner surfaces 68, 70 is tangent to a line 74, which is tangent to the upper surfaces 76, 78 of horns 32, 34. Bending axis 50 is located so that when plate 48 is bent into structural angle 52, the throat dimension "d" measured from the mounting surfaces 82, 84 of horns 32, 34 to side 60 of C-shaped cutout 58 is equal to the thickness of tablet computer 8.

Figure 3:
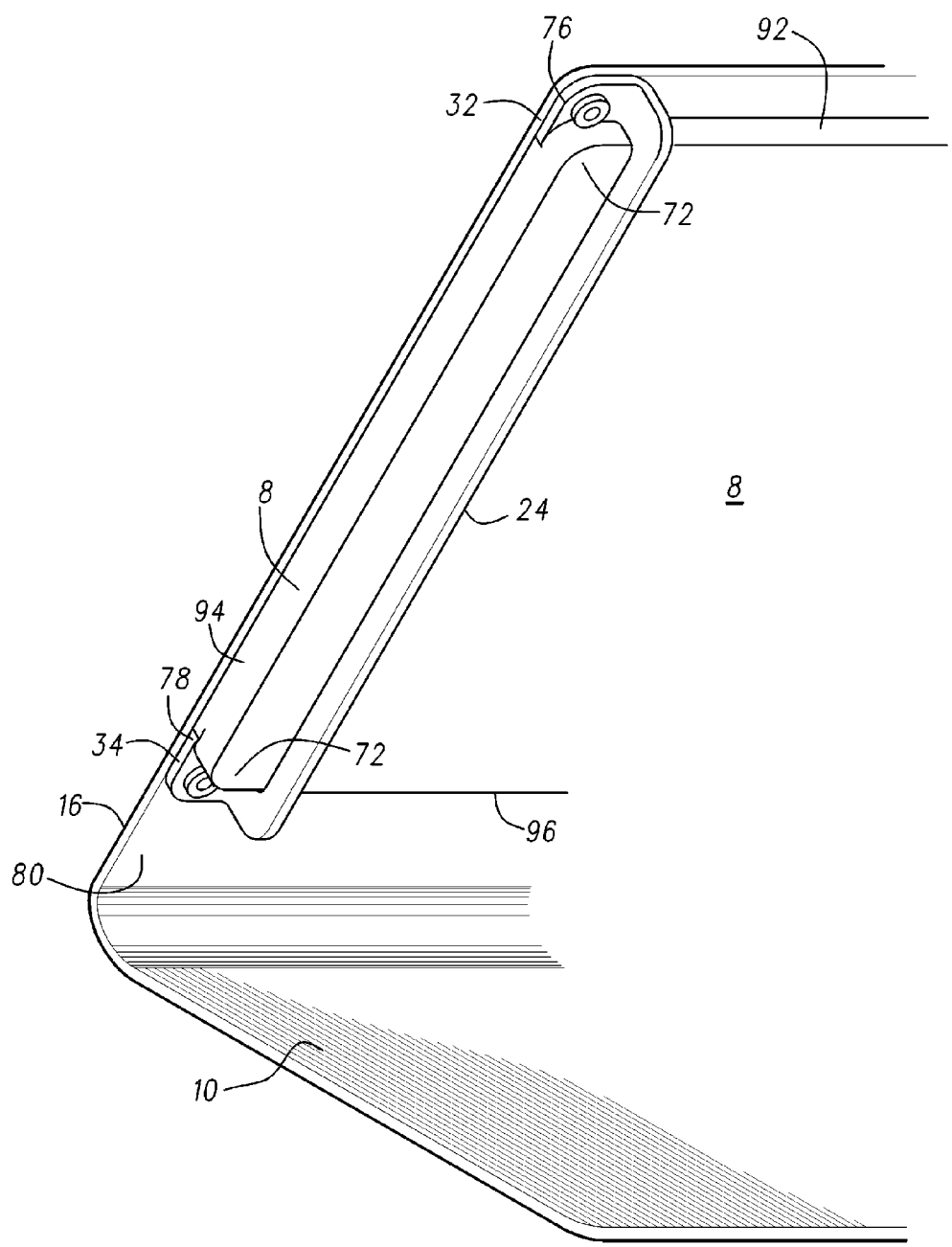
FIG. 3 is a partial rear perspective view of the tablet stand of FIG. 1.
Figure 4:
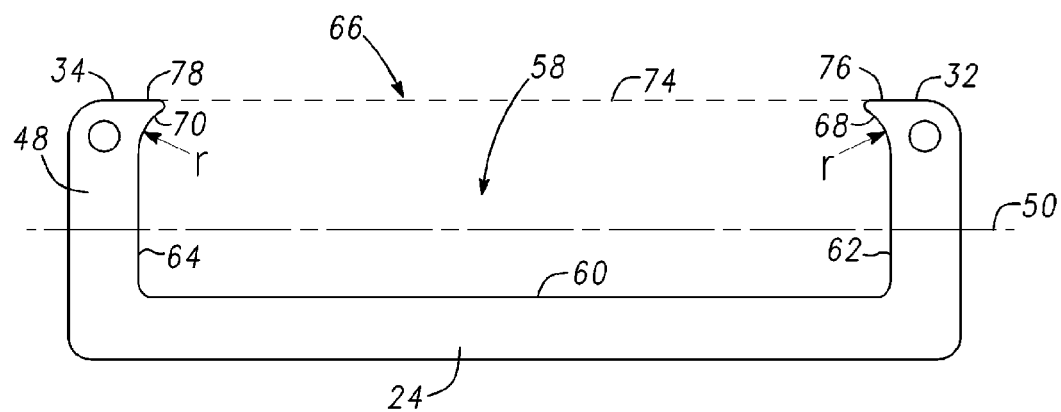
FIG. 4 is a side view of a retaining bracket incorporated into the tablet stand of FIG. 1 prior to forming.
Figure 5:
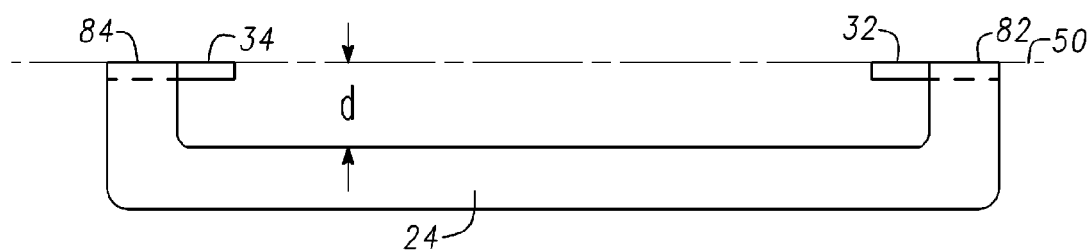
FIG. 5 is a side view of the retaining bracket of FIG. 4 after forming.

With particular reference to FIGS. 2-3, retaining bracket 24 is secured to the upper portion 16 of frame 12 by means of threaded fasteners 28, 30 which may be any conventional threaded fastener but preferably comprise TORX® pin-head or similar tamper-resistant fasteners. Rubber pads 40, 42 are disposed between tablet computer 8 and upper portion 16 of frame 12 to prevent rattling. Because throat dimension "d" is equal to the thickness of tablet computer 8, tablet computer 8 is trapped between side 60 of C-shaped cutout 58 and the rear surface 80 of upper portion 16 of frame 12. This constrains tablet computer 8 from any motion normal to the screen.

Simultaneously, inner surfaces 68, 70 of horns 32, 34 engage tablet computer 8 along its top surface 92, side surface 94 and bottom surface 96. This constrains tablet computer 8 from any motion up, down, or laterally to the right in the plane of the screen. Preferably, retaining bracket 24 is secured to frame 12 so that upper surfaces 76, 78 of horns 32, 34 are aligned with outer edge 38 of frame 12. As noted hereinbefore, the center of curvature of the inner surfaces 68, 70 of horns 32, 34 are positioned so that a circle tangent to the inner surfaces 68, 70 is tangent to the upper surfaces 76, 78 of horns 32, 34. Accordingly, when retaining bracket 24 is secured to frame 12 so that upper surfaces 76, 78 of horns 32, 34 are aligned with outer edge 38 of frame 12, the side of tablet computer is aligned exactly with outer edge 38 of frame 12. This permits the use of plug-in devices such as POS card readers, which are dimensionally thicker than most tablet computers, to be connected to the side of tablet computer 8 without interference from tablet stand 10.

Retaining bracket 26 is substantially identical in construction to retaining bracket 24 and therefore will not be discussed in detail herein. Retaining bracket 26 is secured to upper portion 16 of frame 12 in a similar manner to retaining bracket 24 along the outer edge 36 of frame 12. This constrains tablet computer 8 from any motion up, down, or laterally to the left in the plane of the screen.

The unique design of retaining brackets 24, 26 trap tablet computer so that the lateral edges of the tablet computer are accessible without interference from the tablet stand 10. Additionally, because retaining brackets 24, 26 are formed into structural angles, retraining brackets 24, 26 significantly increase the section modulus and rigidity of upper portion 16 of frame 12, which would otherwise have an unacceptably high degree of flexibility or would require separate additional external bracing. Thus retaining brackets 24, 26 synergistically brace upper portion 16 of frame 12 while retaining tablet computer 8.

Figure 6:
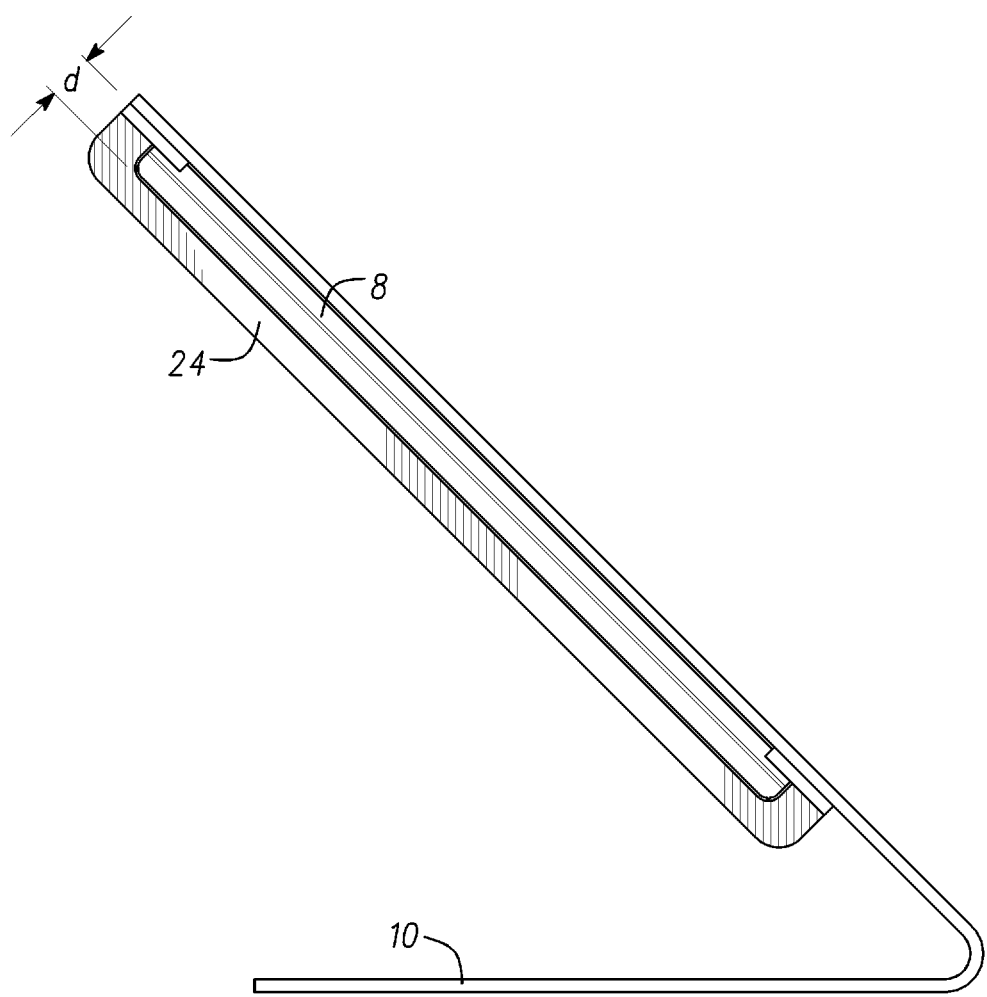
FIG. 6 is a side view of the tablet stand of FIG. 1.
Figure 7:
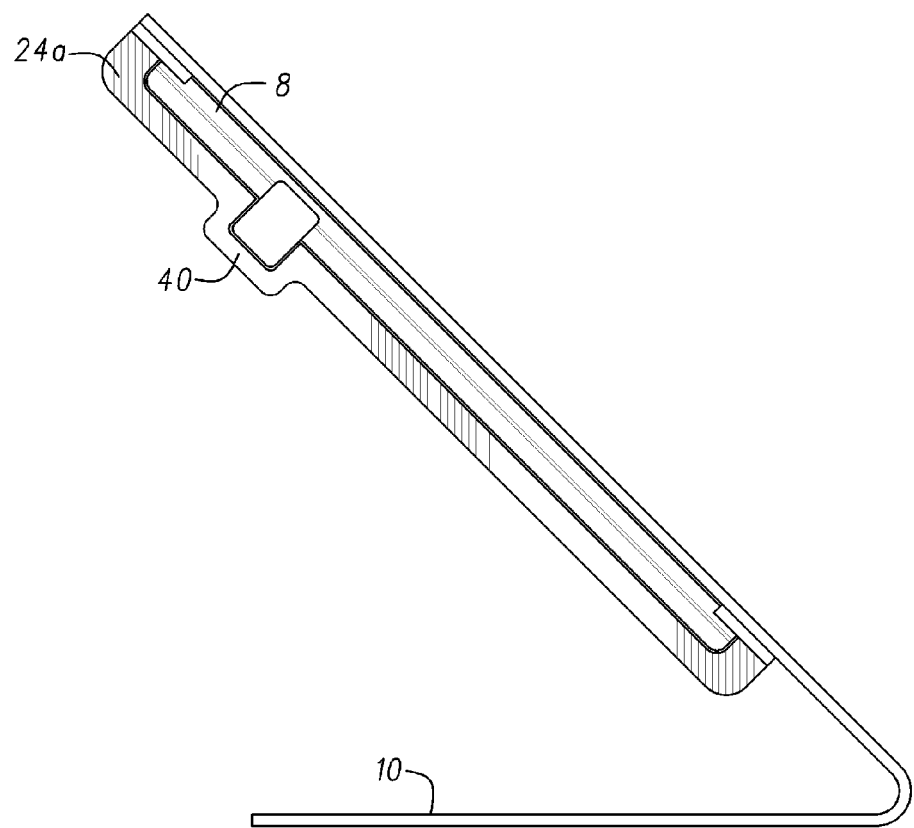
FIG. 7 is a side view of an alternative embodiment of a tablet stand incorporating features of the present invention.
Figure 8:
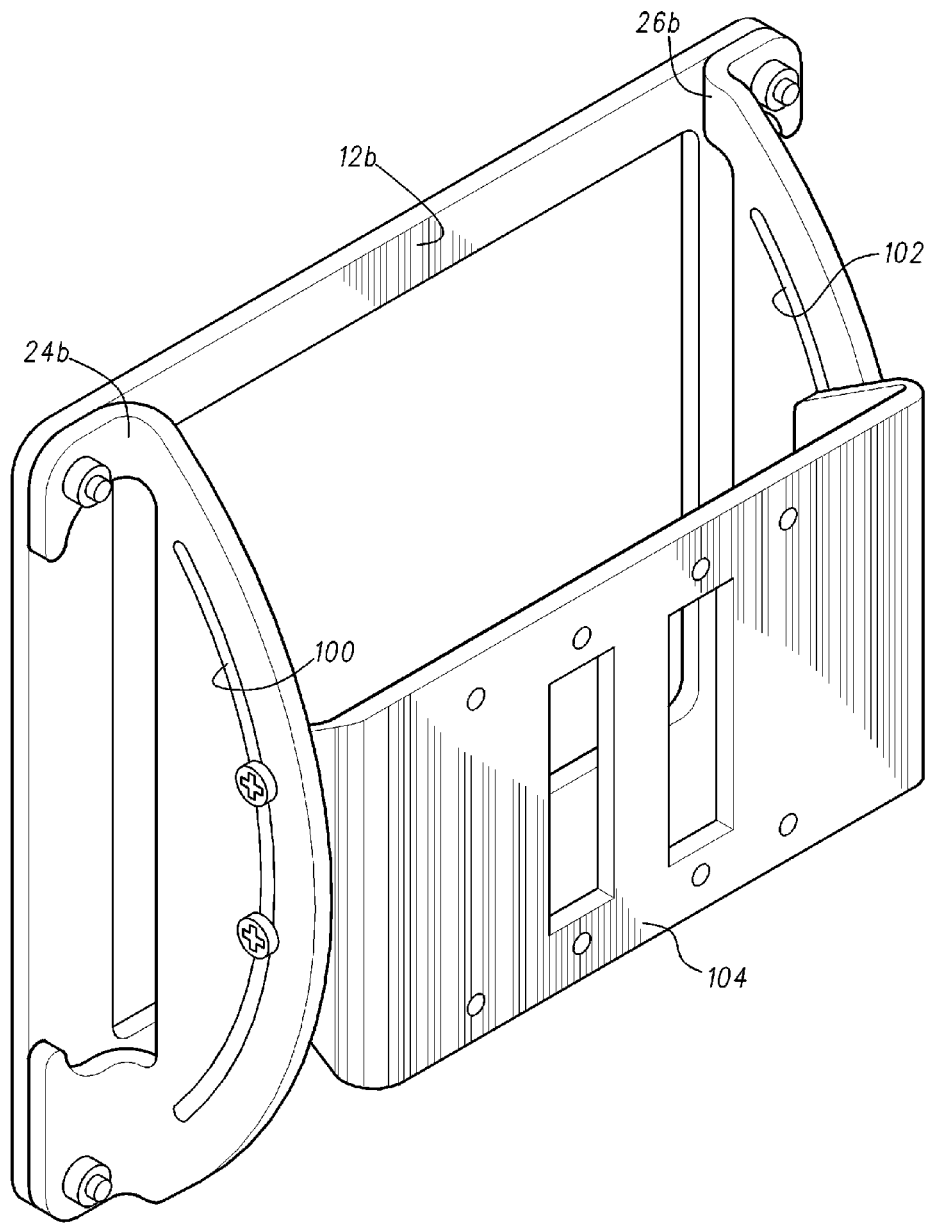
FIG. 8 is a side view of another alternative embodiment of a tablet stand incorporating features of the present invention.

Although certain illustrative embodiments and methods have been disclosed herein, it will be apparent from the foregoing disclosure to those skilled in the art that variations and modifications of such embodiments and methods may be made without departing from the invention. For example in lieu of a straight surface 60 of retaining bracket 24 as shown in FIG. 6, retaining bracket 24a may have an additional recess 40 to accommodate a plug-in card reader that wraps around the back of the tablet computer as shown in FIG. 7. Moreover, as shown in FIG. 8, retaining brackets 24b, 26b may be extended to include slots or other apertures for mounting to a wall-mounting bracket, in which case lower portion 22 of frame 12 may be omitted. Finally, although in the illustrative embodiment, retaining bracket 24 is formed from a generally rectangular plate 48 that is bent along a bending axis 50 approximately 90°, a bending angle of more or less than 90°, for example from 45° to 135° or even 30° to 140° is considered within the scope of the invention as long as the resulting bracket 24 has an increased section modulus over that of a flat plate. Accordingly, it is intended that the invention should be limited only to the extent required by the appended claims and the rules and principles of applicable law. Additionally, as used herein, references to direction such as "up" or "down" are intend to be exemplary and are not considered as limiting the invention and, unless otherwise specifically defined, the terms "generally," "substantially," or "approximately" when used with mathematical concepts or measurements mean within ±10 degrees of angle or within 10 percent of the measurement, whichever is greater. As used herein, a step of "providing" a structural element recited in a method claim means and includes obtaining, fabricating, purchasing, acquiring or otherwise gaining access to the structural element for performing the steps of the method. As used herein, the claim terms are to be given their broadest reasonable meaning unless a clear disavowal of that meaning appears in the record in substantially the following form ("As used herein the term _____ is defined to mean _____")

What is claimed is:

1. Apparatus for mounting a tablet computer, the tablet computer having a view screen and a housing with a thickness dimension, the view screen having a substantially rectangular shape with a long and a short side, the housing having a substantially rectangular shape with radiused corners, the apparatus comprising:
   a unitary frame comprising a flat panel having a viewing aperture formed therein, the viewing aperture having a size and shape substantially equivalent to the view screen of the tablet computer;
   a pair of retaining brackets removably attached to the unitary frame along two opposite sides of the viewing aperture, each of the retaining bracket comprising an elongate plate bent along bending axis to form a structural angle having a first flange, a second flange and a length dimension, the second flange having a mounting surface aligned with the bending axis, the first flange having a first cutout intersecting the bending axis, the first cutout having a length dimension and a height dimension, the height dimension, measured from the mounting surface, being substantially equal to the thickness dimension of the tablet computer housing over a major portion of the length dimension, the second flange having a second cutout intersecting the first cutout, the second cutout forming a pair of horns disposed in a juxtaposed spaced-apart configuration, each of the horns having an upper surface and an inside surface opposite the upper surface, the inside surface having an inside radius substantially equivalent to the radius corners of the housing; and
   means for removably mounting the retaining brackets to the frame.

2. The apparatus of claim 1, wherein:
the retaining bracket is formed by making an elongate C-shaped cutout in a flat plate to form the first and second cutouts, then bending the plate along the bending axis.

3. The apparatus of claim 2, wherein:
the elongate C-shaped cutout is formed by laser-cutting.

4. The apparatus of claim 1, wherein:
the unitary frame comprises a base portion extending from a lower edge of the flat panel, the base portion including at least one slotted opening for feeding a cable to the tablet computer.

5. The apparatus of claim 1, wherein:
the first flange of the retaining bracket comprises an extended portion, the extended portion including a pair of apertures for mounting to a wall plate.

6. The apparatus of claim 1, wherein:
the first flange of the retaining bracket includes a stepped portion sized and shaped to accommodate a plug-in card reader.

7. The apparatus of claim 1, wherein:
the inside surface of each of the horns has a center of curvature located so that a circle tangent to the inside surface is tangent to a line that is tangent to the upper surface of each of the horns, whereby the tablet computer is held to the frame with a side of the tablet computer flush with a side of the frame.

* * * * *